May 16, 1950     O. B. SUTTON     2,508,000
REFRIGERATION

Filed March 18, 1947     2 Sheets-Sheet 1

INVENTOR.
Otis B. Sutton
BY
Harry S. Dunarr
ATTORNEY.

May 16, 1950      O. B. SUTTON      2,508,000

REFRIGERATION

Filed March 18, 1947      2 Sheets-Sheet 2

INVENTOR.
Otis B. Sutton
BY
Harry S. Dumaser
ATTORNEY.

Patented May 16, 1950

2,508,000

UNITED STATES PATENT OFFICE 2,508,000

REFRIGERATION

Otis B. Sutton, Canton, Ohio, assignor to The Hoover Company, North Canton, Ohio, a corporation of Ohio Application March 18, 1947, Serial No. 735,514

17 Claims. (Cl. 62—119.5)

This invention relates to the art of refrigeration and more particularly to a refrigerating system of the three fluid absorption type particularly designed and constructed to operate a portion thereof at temperatures sufficiently low to preserve deep frozen food stuffs; that is, temperatures in the range of 0° Fahrenheit.

It is a further object of the invention to provide an absorption refrigerating apparatus characterized by the provision of a plurality of evaporators operating at relatively high and relatively low temperatures in which the low temperature evaporator is supplied with cold liquid refrigerant and cold inert gas highly stripped of refrigerant vapor from an absorber which is cooled by a special evaporator.

It is a particular object of the present invention to provide an absorption refrigerating apparatus of the inert gas type provided with a second evaporator structure particularly designed to produce refrigeration temperatures sufficiently low to preserve deep frozen food stuffs in which the very low temperature evaporator is provided with cold inert gas, cold liquid refrigerant and highly stripped inert gas by a combination in which a separate evaporator refrigerates the absorber for the low temperature evaporator as well as the inert gas and liquid refrigerant en route thereto.

It is a further object of the present invention to provide an inert gas type absorption refrigerating apparatus characterized by the provision of a branch inert gas circuit connected in parallel with the ice freezing and food storage refrigerating evaporator including an auxiliary absorber, a very low temperature evaporator and an auxiliary evaporator for refrigerating the auxiliary absorber and the refrigerant and inert gas en route to the low temperature evaporator.

Figure 1:
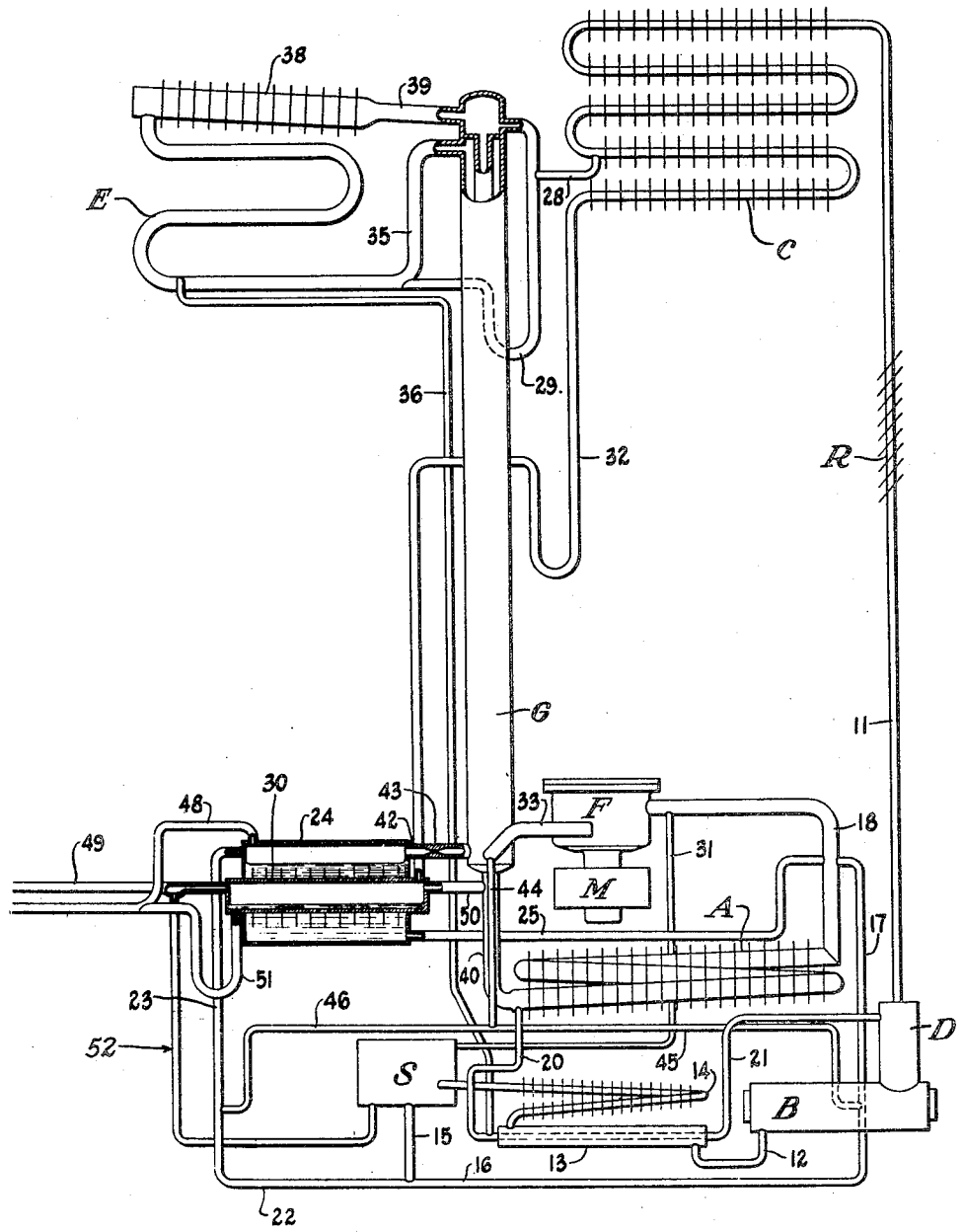
Figure 2:
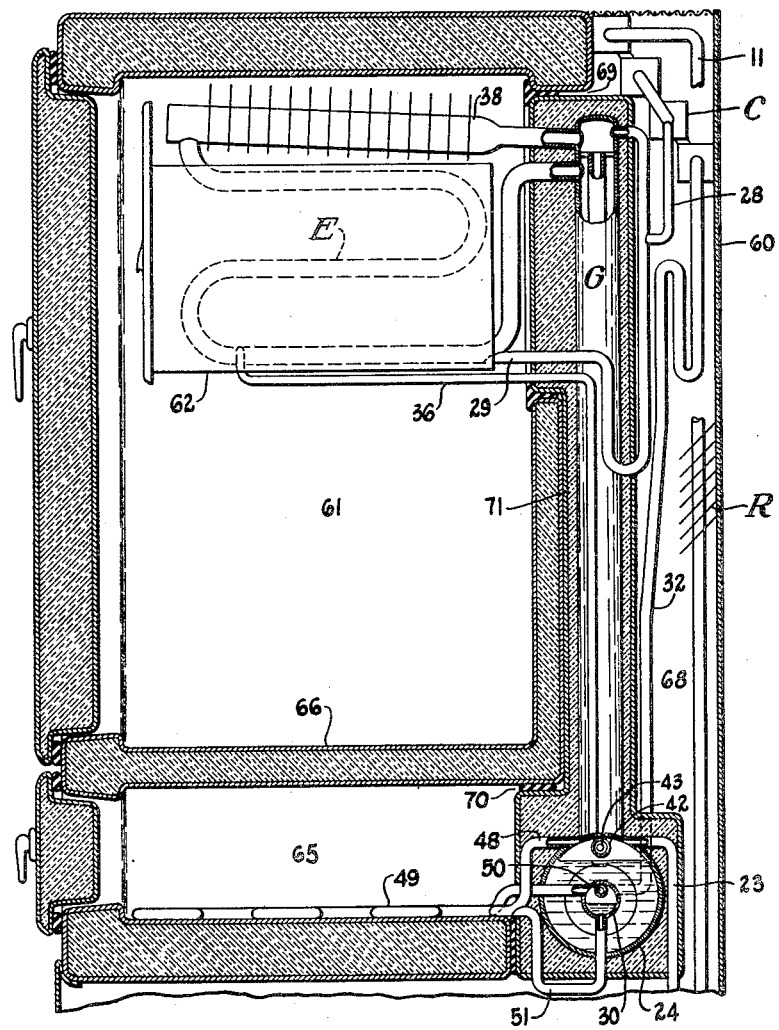

Other objects and advantages of the invention will become apparent as the description proceeds when taken in connection with the accompanying drawing in which Figure 1 is a schematic representation of one form of the invention and Figure 2 is a side sectional elevational view of the invention of Figure 1 applied to a domestic refrigerating cabinet construction.

Referring now to Figure 1 of the drawing, a refrigerating system of the inert gas absorption type is diagramatically represented. This apparatus will be charged with a suitable refrigerant such as ammonia, an absorbent therefore such as water, and an inert pressure equalizing medium preferably a dense gas such as nitrogen.

The apparatus comprises a tubular boiler B upon which is mounted an upstanding analyzer D. The boiler B contains a solution of refrigerant in absorbent which liberates refrigerant vapor when heated. Vapor so liberated passes upwardly through the analyzer D and is conveyed therefrom to the tubular air cooled condenser C by way of the conduit 11 and rectifier R.

The weakened solution in the boiler from which refrigerant has been evolved flows therefrom to a solution reservoir S through the conduit 12, liquid heat exchanger 13 and the finned solution cooling conduit 14. The solution supplied to the reservoir S flows therefrom to a plurality of absorbers.

Solution is removed from the reservoir S by the conduit 15 which supplies solution to conduit 16 having a vertical portion 17 which operates as a gas lift pump in a manner to be described hereinafter. The conduit 17 discharges into the gas outlet pipe 18 of a tubular air cooled absorber A. The lean solution flows downwardly through the absorber by gravity in counter-flow relation and in contact with an inert gas refrigerant vapor mixture from which it absorbs refrigerant. The enriched solution reaching the lower end of the absorber A is then returned to the generating assembly by conduit 20, liquid heat exchanger 13 and conduit 21 which discharges into the upper portion of the upstanding analyzer D.

Solution flowing through the conduit 15 also flows though conduit 22 which has an upstanding gas lift pump portion 23. The conduit 23 discharges into the upper end of an absorber vessel 24 wherein this solution is also contacted by an inert gas refrigerant vapor mixture. The partially strengthened solution formed in absorber 24 is then conducted to the absorber gas discharge conduit 18 by conduit 25 and flows through the absorber and returns to the boiler along with the absorbing solution supplied to conduit 18 by the gas lift pump 17.

The refrigerant vapor supplied to condenser C is liquefied therein by heat exchange with atmospheric air. The liquid formed in the upper portion of the condenser is conveyed to the evaporator E by conduit 28 and U-shaped conduit 29 which opens into the lower portion of the evaporator. The upper portion of conduit 29 opens into the gas heat exchanger G to provide a vent for the condenser system. In the upper portion of the condenser substantially all absorbing solution vapor which succeeds in passing the rectifier is condensed. The vapor which reaches the lower portion of the condenser C beyond the point of connection with conduit 28 is substantially pure refrigerant vapor and the liquid formed therein is substantially pure liquid refrigerant. The liquid refrigerant formed in the lower portion of the condenser C is conveyed by a U-shaped trap sealed conduit 32 to an evaporator 30 positioned within the absorber 24.

The absorber A and the evaporator E are linked together in an inert gas circuit. The lean inert gas formed in the absorber flows through the conduit 18 to the inlet of a circulating fan or pump F which is driven by an electrical motor M. A vent conduit 31 connected between the upper portion of the reservoir S and conduit 18 serves to relieve the reservoir of any vapors which may be formed therein and to maintain the reservoir at substantially the suction pressure of the pump F. The pump F also receives pumping gas which discharges through gas lift pump conduit 17. The inert gas is placed under pressure by the pump F and is conveyed therefrom to the lower portion of the evaporator E by conduit 33, the gas heat exchanger G and conduit 35. In the evaporator the propelled stream of inert gas meets the liquid refrigerant supplied through the conduit 29 and circulates the same through the evaporator as the liquid is evaporating into the inert gas to produce the desired refrigerating effect. An overflow conduit 36 is connected between the upper portion of the lowest evaporator coil and the rich solution return conduit 20 in order to relieve the evaporator of excess liquid should the same ever accumulate therein to a degree tending to form a complete block on gas flow.

The upper portion 38 of the evaporator E is provided with fins for the purpose of cooling air within the food storage compartment of the refrigerator. The rich inert gas refrigerant vapor mixture formed in the evaporator E is conveyed to the bottom portion of the absorber through conduit 39, gas heat exchanger G and conduit 40. The inert gas flows upwardly through the absorber in counter-flow relationship with the lean solution flowing downwardly therethrough whereby the solution absorbs refrigerant vapor from the gas refrigerant vapor mixture. The heat of absorption is rejected to cooling air flowing across the exterior surfaces of the absorber tubes and the fins mounted thereon.

A portion of the inert gas discharging through the high pressure discharge conduit 33 of the pump F is removed therefrom through a gas lift pump supply conduit 44 and is conveyed to the gas lift pumps 17 and 23 by conduits 45 and 46, respectively, in order to supply these conduits with pumping gas under pressure to elevate absorbing solution from the reservoir S into the absorbers A and 24 respectively.

A branch inert gas circuit is also provided for the purpose of operating an extremely low temperature evaporator. A portion of the inert gas under pressure discharged into the gas heat exchanger G is withdrawn therefrom through the conduit 42 which includes a gas flow restricting element 43 in order to prevent too great a proportion of the gas flowing through conduit 42 and to meter the gas flow through this circuit to the desired value.

The quantity of inert gas which the restrictor 43 allows to traverse the branched inert gas circuit will vary with the relative sizes and loads to be carried by the evaporators in the main and branched inert gas circuits. The restrictor must pass sufficient inert gas to prevent the refrigerant vapor pressure in evaporator 49 from increasing sufficiently to cause evaporation of refrigerant in evaporator 49 above the maximum temperature to be carried in this evaporator when all the refrigerant liquid supplied thereto evaporates. The quantity of inert gas supplied to the branched inert gas for a domestic refrigerator of the type shown in Figure 2 is approximately 20% of the total inert gas handled by the pump F.

The inert gas flowing through the conduit 42 and restrictor 43 enters the upper gas space of the absorber 24 and flows across the surface of the lean absorbing solution supplied thereto from conduit 23. The inert gas discharging through conduit 42 has just completed its traverse of the absorber A and hence is what is customarily known in this art as lean gas; that is, the refrigerant vapor content thereof is reduced to the lowest value customarily encountered in conventional types of inert gas absorption refrigerating machines. In its passage through the absorber 24 the already low refrigerant vapor content of this mixture is further reduced materially because the solution in the absorber 24 surrounds the evaporator 30 and is maintained at a very low temperature which will enable it to absorb refrigerant vapor from the normally lean inert gas supplied thereto. The inert gas further reduced in refrigerant concentration in the absorber 24 is conveyed therefrom through conduit 48 to a low temperature evaporator conduit 49 in which liquid refrigerant, supplied from a source to be described hereinafter, evaporates into the inert gas at extremely low temperatures to produce a refrigerating effect suitable for the preservation of deep frozen food stuffs. The inert gas partially enriched in evaporator 49 exits therefrom into the evaporator 30 wherein it comes in contact with the liquid refrigerant supplied to evaporator 30 through conduit 32. A portion of the liquid refrigerant in evaporator 30 evaporates into the partially enriched inert gas discharging from evaporator 49 at temperature levels considerably higher than those which prevail in the evaporator 49. The refrigerating effect produced in the evaporator 30 serves to refrigerate the absorber 24 within which it is contained, to refrigerate the inert gas flowing through the absorber 24, and to refrigerate the liquid refrigerant within the evaporator 30. The rich inert gas formed in evaporator 30 is then conducted by the conduit 50 to the rich gas conduit 40 of the main inert gas circuit.

The liquid refrigerant not evaporated in evaporator 30 is reduced to a very low temperature by such evaporation as does occur and is conveyed to the evaporator 49 by the U-shaped liquid sealed trap conduit 51. This liquid then evaporates into the inert gas in evaporator 49 to produce the low temperature refrigerating effect heretofore mentioned.

A drain conduit 52 is connected between the gas discharge end of the evaporator 49 and the solution reservoir S for returning any unevaporated liquid which may reach this point to the solution circuit.

The liquid refrigerant supplied to the evaporators 30 and 49 is substantially free of absorbent because it is the last condensed refrigerant. This feature facilitates the attainment of low temperatures in the evaporator 49 because even a slight contamination of the refrigerant liquid with absorbent increases the vaporization temperature of the refrigerant for a given vapor pressure.

In the above described refrigerating system, the normal air cooling and ice freezing loads of the refrigerator are supplied by an evaporator linked in a principal inert gas circuit with an air cooled absorber A. The inert gas traversing the principal inert gas circuit functions in what may be termed a normal concentration range to pick up refrigerant vapor in the evaporator and to discharge or give up refrigerant vapor to solution in the absorber. A portion of the lean inert gas in this circuit is diverted away from the evaporator E and flows through a branched or by-pass circuit in which its refrigerant vapor content is still further reduced, the gas temperature is reduced and the gas then flows through an extremely low temperature evaporator in which it picks up some refrigerant vapor at very low temperature level. From this evaporator the diverted gas then flows through a second evaporator in which it picks up further refrigerant vapor and aids in refrigerating the absorber and the inert gas flowing to the low temperature evaporator. After traversing this evaporator the diverted gas then returns to the principal absorber.

The above described refrigerating system further embodies an absorbing solution circuit in which the solution deprived of refrigerant in the generator is divided into two streams one of which flows to the principal absorber and back to the generator and the other of which flows through a second low temperature absorber linked in the above mentioned by-pass inert gas circuit and thence flows through the principal absorber and back to the generator.

Referring now to Figure 2, the manner in which the foregoing described refrigerating system is associated with a cabinet will be described. The arrangement of the solution circulating pump, absorber A, reservoir S and generating assembly B—D in relation to each other and to the cabinet will be one of several known conventional arrangements positioned in the lowest part of the cabinet construction, hence this matter is not illustrated in Figure 2.

In Figure 2 there is shown a cabinet construction 60 having an insulated food storage and ice freezing compartment 61 which houses evaporator sections E and 38. The evaporator E is encased within an ice freezing compartment housing 62 which will be provided with suitable shelves and the like for supporting ice trays. The evaporator 38 is positioned above the housing 62 and evaporator E and is exposed to the air within the insulated compartment 61. Underlying compartment 61 there is a low temperature or deep freezing compartment 65 which is separated from compartment 61 by the insulated partition 66.

Since the temperatures carried in the chamber 65 are much lower than those which are maintained in the chamber 61 the former chamber may be more heavily insulated than chamber 61 except that the insulated wall 66 need not be so heavy since the temperature differential across it is considerably less than that which will prevail between the interior of chamber 65 and the surrounding air.

That portion of the cabinet construction lying rearwardly of the chamber 61 and 65 is formed to provide an air flue 68 which receives the condenser C, rectifier R and certain of the connecting conduits between the various elements of the system.

The rear wall of the insulated cabinet construction comprising the chambers 61 and 65 is provided with an opening 69 of a size sufficient to permit the evaporator structure E and 38 to be passed therethrough into the interior of the chamber 61. Similarly the rear wall of the chamber 65 is also provided with an opening 70 of a size sufficient to permit the evaporator 49 to be inserted into the interior of the chamber 65.

An insulated structure designated generally as 71 and extending substantially the full height of the compartment 61 and 65 is provided within which is encased the gas heat exchanger G, the absorber 24 and its contained evaporator 30 and such of the connecting pipes for the various parts of the apparatus that may conveniently be located within this element. The insulated body structure 71 is arranged to fit into the openings 69 and 70 to close the same and to engage with the other portions of the rear wall of chambers 61 and 65 to provide additional insulation therefor. The element 71 and encased parts will be constructed as part of the refrigerating apparatus per se rather than the cabinet per se so that the same may be completely assembled with the refrigerating apparatus after which the complete refrigerating system and the element 71 may be assembled with the cabinet structure 60 simply by sliding the same forwardly from the rear thereof with the evaporators E and 49 positioned to enter their respective compartments 61 and 65.

The foregoing cabinet and refrigerating system arrangement is a highly desirable one in that it positions the relatively little used low temperature chamber 65 below the more frequently used higher temperature compartment 61; that is, the most frequently used portions of the refrigerating apparatus are those which are most readily accessible to the users. Additionally, the low level of the chamber 65 facilitates the supply of absorbing solution to the absorber 24 without imposing an undue lifting load upon the gas lift pump 23 which actually conveys the solution to the absorber 24.

Since the absorber 24 and its contained evaporator function solely to transfer heat within the refrigerating system proper, it is desirable that there be no transfer of heat between these elements and sources external to the refrigerating system per se. For this reason these elements are heavily insulated which serves to promote the total economy of the system.

The present arrangement provides a system in which the ordinary refrigerating load consisting of normal food preservation and ice freezing is carried by an evaporator in an inert gas circuit with an ultimate heat rejecting air cooled absorber. A by-pass inert gas circuit including an additional stripping absorber, an evaporator for refrigerating the same, and an external load carrying evaporator which operates at extremely low temperatures suitable for the long term preservation of deep frozen food stuffs is also provided. The by-pass circuit is characterized by an arrangement of parts in which the low temperature evaporator is supplied with highly stripped cold inert gas and very cold substantially pure liquid refrigerant so that no significant portion of the refrigeration produced therein is utilized for the purpose of lowering the temperature of liquid refrigerant or inert gas supplied thereto.

While only one form of the invention has been illustrated and described herein, it is to be understood that various changes may be made in the construction and arrangement of the parts without departing from the spirit of the invention or the scope of the appended claims.

I claim:

1. In a refrigerating apparatus a first evaporator, a first absorber, a second evaporator, a second absorber, a generator, a condenser connected to receive refrigerant vapor from said generator and to supply refrigerant liquid to said evaporators, means for conducting inert gas from said first absorber to said first evaporator, means for conducting inert gas from said second absorber to said second evaporator, means for conducting inert gas flowing away from said second evaporator into contact with refrigerant liquid flowing to said second evaporator and in heat exchange relation with said second absorber.

2. In a refrigerating apparatus a first evaporator, a first absorber, a second evaporator, a second absorber, a generator, a condenser connected to receive refrigerant vapor from said generator and to supply refrigerant liquid to said evaporators, means for conducting inert gas from said first absorber to said first evaporator and said second absorber in parallel, means for conducting inert gas from said first evaporator to said first absorber, means for conducting inert gas from said second absorbert to said second evaporator, means for supplying refrigerant liquid to said evaporators, and means for conducting inert gas from said second evaporator to said first absorber in contact with refrigerant liquid flowing to said second evaporator and in heat exchange relation with said second absorber.

3. In a refrigerating apparatus a pair of evaporators, a pair of absorbers, means for conducting inert gas from each of said absorbers to an associated evaporator, means for supplying refrigerant liquid to each of said evaporators including a generator, means for conducting absorbing solution from said generator to each of said absorbers, means for conducting absorbing solution which has traversed one of said absorbers to the other absorber and means for conducting absorbing solution from said other absorber to said generator and means for passing inert gas which has traversed one of said evaporators into contact with refrigerant liquid flowing to said one evaporator and in heat exchange relation with said one absorber.

4. In a refrigerator a cabinet structure having an insulated food preserving chamber and a low temperature refrigerating chamber, an absorption refrigerating system of the inert gas type associated with said cabinet including an evaporator in each of said chambers, an absorber embedded in the insulation of said cabinet connected to supply inert gas to the evaporator in said refrigerating chamber, an evaporator arranged to refrigerate said absorber, and a primary absorber positioned exteriorly of said insulated chambers and arranged to supply inert gas to said embedded absorber and the evaporator in said food preserving chamber.

5. In a refrigerator a cabinet structure having an insulated food preserving chamber and a low temperature refrigerating chamber, an absorption refrigerating system of the inert gas type associated with said cabinet including an evaporator in each of said chambers, an absorber embedded in the insulation of said cabinet connected to supply inert gas to the evaporator in said refrigerating chamber and an evaporator arranged to refrigerate said absorber, means for flowing inert gas which has traversed said evaporator in said refrigerating chamber and refrigerant liquid flowing to said evaporator in said refrigerating chamber to said evaporator in heat exchange relation with said absorber, and a primary absorber positioned exteriorly of said insulated chambers and arranged to supply inert gas to said embedded absorber and the evaporator in said food preserving chamber.

6. In a refrigerator, a cabinet structure including an insulated food storage chamber and an insulated low temperature chamber, an ice freezing compartment in said food storage chamber, an evaporator arranged to refrigerate said ice freezing chamber and said food storage chamber, an evaporator arranged to refrigerate said low temperature chamber, an absorber connected to supply inert gas to said evaporator in said low temperature chamber, an evaporator arranged to refrigerate said absorber, means for supplying refrigerant liquid to said evaporator in said food storage chamber, means for supplying refrigerant liquid to said absorber refrigerating evaporator, means for conducting refrigerant liquid from said absorber refrigerating evaporator to said evaporator in said freezing chamber, and means for conducting inert gas from said freezing chamber evaporator to said absorber refrigerating evaporator.

7. Absorption refrigerating apparatus comprising an evaporator and an absorber, means including a power operated gas circulator for circulating inert gas through said evaporator and said absorber, a branch inert gas circuit connected to said absorber in parallel with said evaporator arranged to receive inert gas from said power operated gas circulator and to return inert gas to said gas circulating means, said branch circuit including an absorber, an evaporator in heat exchange relation with said absorber, a low temperature evaporator and means for limiting the quantity of inert gas flowing in said branched inert gas circuit to a predetermined quantity of the total amount of inert gas in said apparatus.

8. In a refrigerating apparatus a first evaporator, a second evaporator, a first absorber, a second absorber, a generator, means for circulating absorbing solution through said generator and said absorbers, means for withdrawing inert gas from said first absorber and for placing the withdrawn inert gas under pressure, means for conducting part of the withdrawn inert gas to said first evaporator and from said first evaporator to said first absorber, means for conducting part of the inert gas under pressure through said second absorber and said second evaporator in series, means for flowing inert gas from said second evaporator to said first absorber including an evaporating element, means for liquefying refrigerant vapor evolved in said generator and for supplying refrigerant liquid to said first evaporator and said evaporating element and means for conducting refrigerant liquid from said evaporating element to said second evaporator.

9. In a refrigerator a first evaporator, a first absorber, means for placing an inert gas under pressure, means forming an inert gas circuit including said means for placing inert gas under pressure for circulating inert gas through said evaporator and said absorber, a second evaporator, a second absorber, means for conducting inert gas from said inert gas circuit through said second absorber and said second evaporator, an evaporator in heat exchange relation with said second absorber, means for conducting inert gas from said second evaporator to said last mentioned evaporator, and means for supplying refrigerant to said evaporators.

10. In a refrigerator a first evaporator, a first absorber, means for placing an inert gas under pressure, means forming an inert gas circuit including said means for placing inert gas under pressure for circulating inert gas through said evaporator and said absorber, a second evaporator, a second absorber, means for conducting inert gas from said inert gas circuit through said second absorber and said second evaporator, means for limiting the flow of inert gas from said inert gas circuit to said second absorber, an evaporator in heat exchange relation with said second absorber, means for conducting inert gas from said second evaporator to said last mentioned evaporator, and means for supplying refrigerant to said evaporators.

11. In a refrigerator, a first evaporator, a first absorber, means for placing an inert gas under pressure, means forming an inert gas circuit including said means for placing inert gas under pressure for circulating inert gas through said evaporator and said absorber, a second evaporator, a second absorber, means for conducting inert gas from said inert gas circuit through said second absorber and said second evaporator, an evaporator in heat exchange relation with said second absorber, means for conducting inert gas from said second evaporator to said last mentioned evaporator, a condenser, means arranged to supply refrigerant vapor to said condenser, means for conducting the refrigerant first condensed in said condenser to said first evaporator and means for conducting the refrigerant last condensed in said condenser to said evaporator in heat exchange with said second absorber and from said evaporator in heat exchange with said absorber to said second evaporator, and means for supplying absorbing solution to said absorbers.

12. In a refrigerator, a first evaporator, a first absorber, means for placing an inert gas under pressure, means forming an inert gas circuit including said means for placing inert gas under pressure for circulating inert gas through said evaporator and said absorber, a second evaporator, a second absorber, means for conducting inert gas from said inert gas circuit through said second absorber, an evaporator in heat exchange relation with said second absorber in said second inert gas circuit, means for supplying refrigerant liquid to said evaporators, and means for supplying absorbing solution to said absorbers.

13. In a refrigerating apparatus, a first evaporator, a first absorber, a second evaporator, a second absorber, a generator, a condenser connected to receive refrigerant vapor from said generator and to supply refrigerant liquid to said evaporators, means for conducting inert gas from said first absorber to said first evaporator, means for conducting inert gas from said second absorber to said second evaporator, means for conducting inert gas flowing away from said second evaporator into contact with refrigerant liquid flowing to said second evaporator and in heat exchange relation with said second absorber, means for flowing absorbing solution from said generator to said absorbers, means for flowing absorbing solution from said second absorber to said first absorber and means for flowing absorbing solution from said first absorber to said generator.

14. In a refrigerator a cabinet structure including an insulated refrigerating chamber, an insulated freezing chamber underlying said insulated refrigerating chamber, said chambers being formed with evaporator receiving openings in a bounding wall thereof, a refrigerating apparatus associated with said cabinet structure including an evaporator in each of said chambers, an insulated cabinet element secured to said evaporators and filling said openings, an absorber connected to supply inert gas to said evaporator in said freezing chamber, an evaporator arranged to refrigerate said absorber, and said absorber refrigerating element embedded in said insulated cabinet element.

15. Refrigerating apparatus of the absorption type comprising a first evaporator, a second low temperature evaporator, a third evaporator, a principal absorber, an auxiliary absorber in heat exchange with said third evaporator, means for supplying absorbing solution to said absorbers, means for supplying refrigerant liquid to said evaporators, means for flowing inert gas refrigerant vapor mixtures from said first and third evaporators through said principal absorber, means for returning inert gas from said principal absorber to said first evaporator, and means for flowing inert gas from said principal absorber through said second absorber and said second and third evaporators serially.

16. Refrigerating apparatus of the absorption type comprising a first evaporator, a second low temperature evaporator, a third evaporator, a principal absorber, an auxiliary absorber in heat exchange with said third evaporator, a generator, means for conducting lean absorbing solution from said generator to said absorbers in parallel, means for conducting absorbing solution from said auxiliary absorber to said principal absorber, means for flowing absorbing solution from said principal absorber to said generator, means for supplying refrigerant liquid to said evaporators, means for flowing inert gas refrigerant vapor mixtures from said first and third evaporators through said principal absorber, means for returning inert gas from said principal absorber to said first evaporator, and means for flowing inert gas from said principal absorber through said second absorber and said second and third evaporators serially.

17. Refrigerating apparatus of the absorption type comprising a first evaporator, a second low temperature evaporator, a third evaporator, a principal absorber, an auxiliary absorber in heat exchange with said third evaporator, a generator, means for conducting lean absorbing solution from said generator to said absorbers in parallel, means for conducting absorbing solution from said auxiliary absorber to said principal absorber, means for flowing absorbing solution from said principal absorber to said generator, a condenser connected to receive refrigerant vapor from said generator, means for conducting the first condensed refrigerant vapor from said condenser to said first evaporator and means for conducting the last condensed refrigerant vapor from said condenser to said third evaporator and from said third evaporator to said second evaporator, means for flowing inert gas refrigerant vapor mixtures from said first and third evaporators through said principal absorber, means for returning inert gas from said principal absorber to said first evaporator, and means for flowing inert gas from said principal absorber through said second absorber and said second and third evaporators serially.

OTIS B. SUTTON.

REFERENCES CITED

The following references are of record in the file of this patent:

UNITED STATES PATENTS

| Number | Name | Date |
| --- | --- | --- |
| 1,711,553 | Von Platen et al. | May 7, 1929 |
| 2,240,176 | Coons et al. | Apr. 29, 1941 |